(12) United States Patent
Wang et al.

(10) Patent No.: US 11,567,213 B2
(45) Date of Patent: Jan. 31, 2023

(54) DUAL SHAFT AXIAL FLUX MOTOR FOR OPTICAL SCANNERS

(71) Applicant: Innovusion, Inc., Sunnyvale, CA (US)

(72) Inventors: Haosen Wang, Sunnyvale, CA (US); Yimin Li, Cupertino, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 0 days.

(21) Appl. No.: 17/861,114

(22) Filed: Jul. 8, 2022

(65) Prior Publication Data

US 2022/0342080 A1 Oct. 27, 2022

Related U.S. Application Data

(63) Continuation of application No. 17/528,126, filed on Nov. 16, 2021, now Pat. No. 11,422,267.

(Continued)

(51) Int. Cl.
*H02K 7/00* (2006.01)
*G01S 17/931* (2020.01)
(Continued)

(52) U.S. Cl.
CPC ............ *G01S 17/931* (2020.01); *G01S 7/481* (2013.01); *G02B 7/1821* (2013.01); *H02K 7/003* (2013.01);
(Continued)

(58) Field of Classification Search
CPC ... G02B 7/1821; G02B 26/105; G01S 17/931; G01S 7/481; H02K 7/003; H02K 7/083; H02K 16/02
(Continued)

(56) References Cited

U.S. PATENT DOCUMENTS 3,897,150 A   7/1975 Bridges et al.
4,464,048 A   8/1984 Farlow
(Continued)

FOREIGN PATENT DOCUMENTS

CN   204758260 U   11/2015
CN   204885804 U   12/2015
(Continued)

OTHER PUBLICATIONS

Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
(Continued)

*Primary Examiner* — Terrance L Kenerly
(74) *Attorney, Agent, or Firm* — Mauriel Kapouytian Woods LLP; Liang Huang

(57) ABSTRACT

An embodiment of a motorized optical scanner of a Light Detection and Ranging (LiDAR) system used in a motor vehicle is provided. The scanner includes a reflective piece including a substrate and a reflective surface. The scanner further includes a first shaft and a second shaft attached to a first end and a second end of the substrate respectively. The first end and the second end are opposite ends of the substrate along a longitudinal direction of the substrate. The scanner further includes a first bearing and a second bearing coupled to the first shaft and the second shaft respectively. The first bearing and the second bearing are substantially concentric. Movement of the second shaft causes the reflective surface to optically transmit one or more light beams to a field-of-view.

23 Claims, 14 Drawing Sheets

Related U.S. Application Data

(60) Provisional application No. 63/151,034, filed on Feb. 18, 2021.

(51) Int. Cl.
*H02K 7/08* (2006.01)
*G01S 7/481* (2006.01)
*G02B 7/182* (2021.01)
*H02K 16/02* (2006.01)
*G02B 26/10* (2006.01)

(52) U.S. Cl.
CPC ............. *H02K 7/083* (2013.01); *H02K 16/02* (2013.01); *G02B 26/105* (2013.01)

(58) Field of Classification Search
USPC ........................................................ 310/203
See application file for complete search history.

(56) References Cited

U.S. PATENT DOCUMENTS

| | | |
|---|---|---|
| 5,006,721 A | 4/1991 | Cameron et al. |
| 5,157,451 A | 10/1992 | Taboada |
| 5,319,434 A | 6/1994 | Croteau et al. |
| 5,369,661 A | 11/1994 | Yamaguchi et al. |
| 5,442,358 A | 8/1995 | Keeler |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |

(56) References Cited

U.S. PATENT DOCUMENTS

| | | |
|---|---|---|
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik et al. |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |

(56) References Cited

FOREIGN PATENT DOCUMENTS

| WO | 2019079642 | 4/2019 |
|---|---|---|
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued In Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.

DUAL SHAFT AXIAL FLUX MOTOR FOR OPTICAL SCANNERS

CROSS-REFERENCE TO RELATED APPLICATIONS

This application is a continuation of U.S. Non-Provisional patent application Ser. No. 17/528,126, filed Nov. 16, 2021, entitled "DUAL SHAFT AXIAL FLUX MOTOR FOR OPTICAL SCANNERS," which claims priority to U.S. Provisional Patent Application Ser. No. 63/151,034, filed Feb. 18, 2021, entitled "DUAL SHAFT AXIAL FLUX GALVO MOTOR FOR OPTICAL SCANNING SYSTEMS." The entire contents of these applications are hereby incorporated herein by reference.

FIELD

This disclosure relates generally to optical scanning and, more particularly, to a motorized optical scanner of a Light Detection and Ranging (LiDAR) system used in a motor vehicle.

BACKGROUND

Light detection and ranging (LiDAR) systems use light pulses to generate an image or point cloud of the external environment. Some typical LiDAR systems include a light source, a light transmitter, a pulse steering system, and a light detector. The light source generates light pulses that are directed by the pulse steering system in particular directions when being transmitted from the LiDAR system. When a transmitted light pulse is scattered by an object, part of the scattered light is returned to the LiDAR system as a return light pulse. The light detector detects the return light pulse and converts it into an electrical signal for further processing. Using the time it took for the return pulse to be detected after the light pulse was transmitted and the speed of light, the LiDAR system can determine its distance to the object along the path of the transmitted light pulse. The pulse steering system can direct light pulses along different paths to allow the LiDAR system to scan the surrounding environment and produce images or point clouds. LiDAR systems can also use techniques other than time-of-flight and scanning to measure the surrounding environment.

SUMMARY

An embodiment of a motorized optical scanner of a Light Detection and Ranging (LiDAR) system used in a motor vehicle is provided. The scanner includes a reflective piece including a substrate and a reflective surface. The scanner further includes a first shaft and a second shaft attached to a first end and a second end of the substrate respectively. The first end and the second end are opposite ends of the substrate along a longitudinal direction of the substrate. The scanner further includes a first bearing and a second bearing coupled to the first shaft and the second shaft respectively. The first bearing and the second bearing are substantially concentric. Movement of the second shaft causes the reflective surface to optically transmit one or more light beams to a field-of-view.

An embodiment of a Light Detection and Ranging (LiDAR) system used in a motor vehicle is provided. The system includes a motorized optical scanner, which includes a reflective piece including a substrate and a reflective surface. The scanner further includes a first shaft and a second shaft attached to a first end and a second end of the substrate respectively. The first end and the second end are opposite ends of the substrate along a longitudinal direction of the substrate. The scanner further includes a first bearing and a second bearing coupled to the first shaft and the second shaft respectively. The first bearing and the second bearing are substantially concentric. Movement of the second shaft causes the reflective surface to optically transmit one or more light beams to a field-of-view.

An embodiment of a motor vehicle comprising a motorized optical scanner is provided. The motorized optical scanner includes a reflective piece including a substrate and a reflective surface. The scanner further includes a first shaft and a second shaft attached to a first end and a second end of the substrate respectively. The first end and the second end are opposite ends of the substrate along a longitudinal direction of the substrate. The scanner further includes a first bearing and a second bearing coupled to the first shaft and the second shaft respectively. The first bearing and the second bearing are substantially concentric. Movement of the second shaft causes the reflective surface to optically transmit one or more light beams to a field-of-view.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
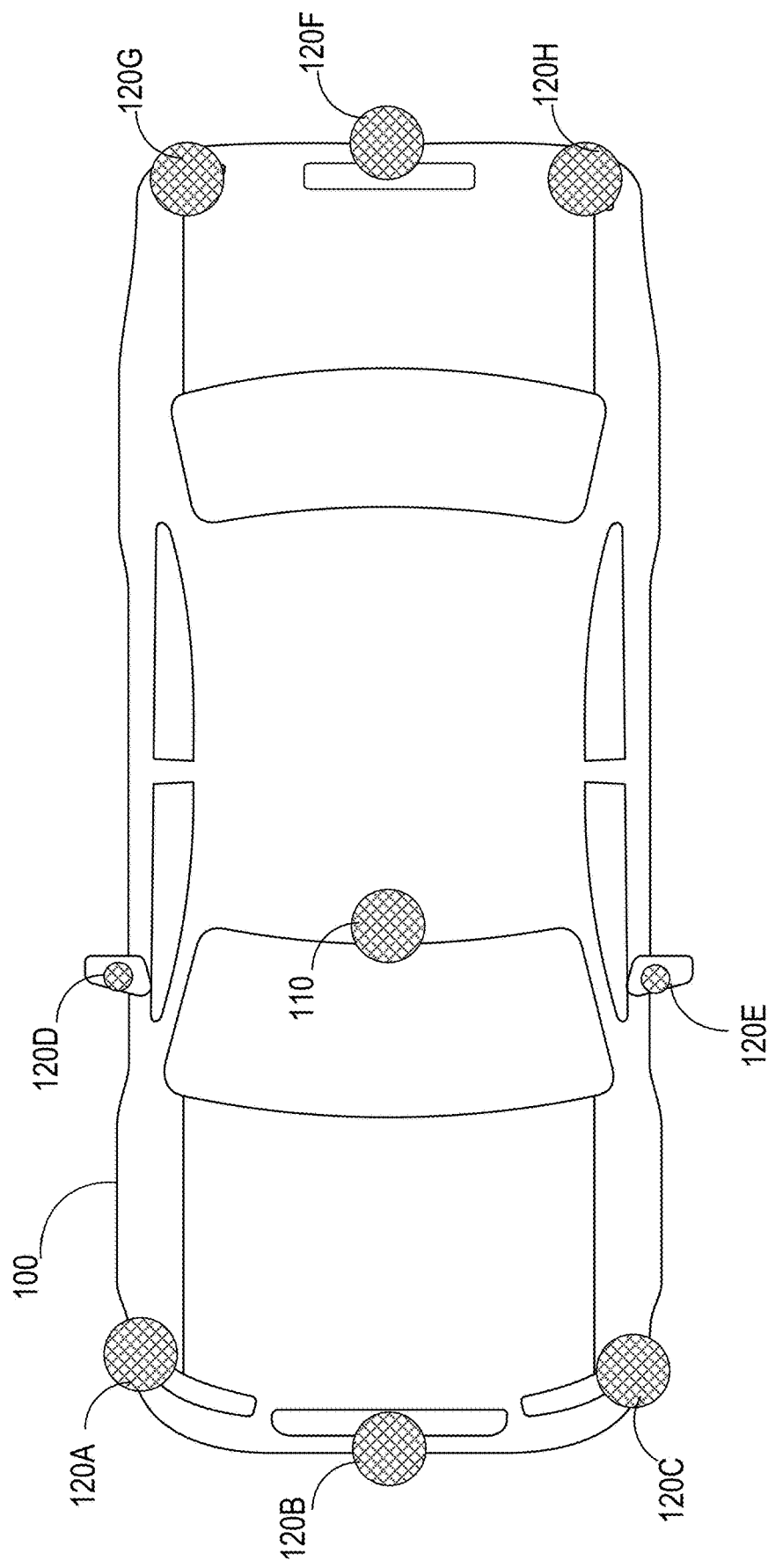
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first bearing could be termed a second bearing and, similarly, a second bearing could be termed a first bearing, without departing from the scope of the various described examples. The first bearing and the second bearing can both be bearings and, in some cases, can be separate and different bearings.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A galvanometer device is typically used in a LiDAR system for scanning laser beams to an FOV. A traditional galvanometer device includes components such as a mirror, a radial-flux motor, a bearing, and an angle encoder. The motor, bearing and angle encoder are usually arranged on the same side of the mirror. As a result, a traditional galvanometer device has a large length. The traditional galvanometer device is also referred to as a single-end galvanometer device because the mirror is installed on one end with a single shaft holding it. This configuration of a traditional galvanometer device may not operate well if the device is used in a high shock or vibration environment (e.g., in a vehicle). Moreover, the large length of the traditional galvanometer device may create difficulty in integrating the device into a compact LiDAR system, which is often required for fitting into a limited space in a vehicle (e.g., fitting into a corner of the bumper, a rear-view mirror, etc.). Further, a traditional galvanometer device is difficult to manufacture in high volume because certain components (e.g., windings of the motor) may need to be manually produced.

Embodiments of present invention are described below. In various embodiments of the present invention, a motorized optical scanner is provided. The scanner can perform scanning of laser beams and can be used to replace a traditional galvanometer device. Various embodiments of the motorized optical scanner adopt a dual shaft structure where a reflective piece is coupled to two shafts at the opposite ends of the reflective piece. Two separate bearings are used for the two shafts. Unlike a single-end galvanometer device, a dual shaft optical scanner has one shaft attached to each side of the reflective piece. Because the reflective piece is supported by a shaft on each end, the dual shaft structure increases the mechanical robustness and reliability of the optical scanner, reduces bending and distortion of the reflective piece, and improves the overall scanning performance even when operating in high shock and vibrating environments. The dual-shaft structure further increases the distance of the two bearings accommodating the two shafts, thereby reducing the concentricity error associated with the machining process for manufacturing the optical scanner.

Embodiments of present invention also provide an optical scanner configuration with an axial flux motor instead of a traditional radial flux motor. As a result, the length of the motor can be reduced by more than half, thereby making the overall optical scanner more compact and in turn making the LiDAR system easier to fit into a compact space in a vehicle. Embodiments of present invention also provide improved windings and accessory components such that the motor can be manufactured and assembled in a high-volume production, effectively enhancing the manufacturing efficiency and reducing the manufacturing cost.

In various embodiments of the present invention, an angular position encoder is disposed at an opposite end of the optical scanner from the end where the axial flux motor is disposed. As a result, the lengths of the scanner portions on each side of the reflective piece (e.g., the mirror) are more balanced or symmetric. This improvement makes the geometry center of the optical scanner in the length direction to be closer to the reflective piece, which enhances the optical system's operability, stability, and overall performance. Further, by disposing the position encoder and the axial flux motor at the opposite ends of the optical scanner, the position encoder has an improved immunity to the noises generated by the motor because the motor is disposed further away as compared to the configuration in the traditional galvanometer device. As a result, the accuracy of the position encoder and in turn overall performance of the optical scanner are improved. Various embodiments of the present invention are described below in more detail.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a high automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-H. LiDAR system 110 and/or 120A-H can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse. A LiDAR system is often an essential sensor of a vehicle that is at least partially automated. In one embodiment, as shown in FIG. 1, motor vehicle 100 may include a single LiDAR system 110 (e.g., without LiDAR systems 120A-H) disposed at the vehicle roof (e.g., at the highest position of the vehicle). Disposing LiDAR system 110 at the vehicle roof facilitates a 360-degree scanning around vehicle 100.

In some other embodiments, motor vehicle 100 can include multiple LiDAR systems, including two or more of systems 110 and/or 120A-H. As shown in FIG. 1, in one embodiment, multiple LiDAR systems 110 and/or 120A-H are attached to vehicle 100 at different locations of the vehicle. For example, LiDAR system 120A is attached to vehicle 100 at the front right corner; LiDAR system 120B is attached to vehicle 100 at front center; LiDAR system 120C is attached to vehicle 100 at the front right corner; LiDAR system 120D is attached to vehicle 100 at the right-side rear view mirror; LiDAR system 120E is attached to vehicle 100 at the left-side rear view mirror; LiDAR system 120F is attached to vehicle 100 at the back center; LiDAR system 120G is attached to vehicle 100 at the rear right corner; and/or LiDAR system 120H is attached to vehicle 100 at the rear left corner. In some embodiments, LiDAR systems 110 and 120A-H are independent LiDAR systems having their own respective laser source, control electronics, transmitter, receiver, and/or steering mechanisms. In other embodiments, some of LiDAR systems 110 and 120A-H can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates some embodiments. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
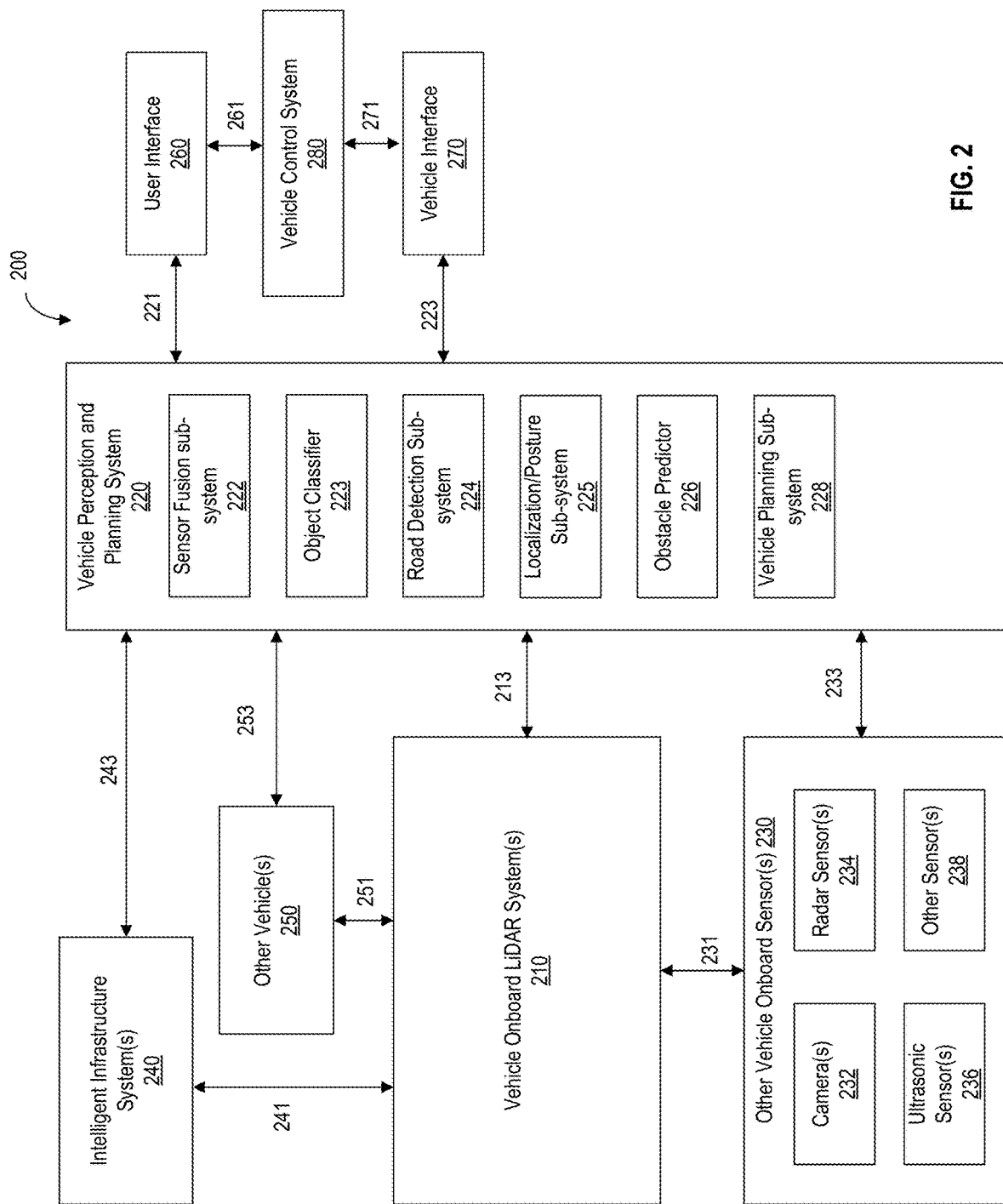
FIG. 2 illustrates a block diagram illustrating interactions between a LiDAR system and multiple other systems including a vehicle perception and planning system.

FIG. 2 is a block diagram 200 illustrating interactions between LiDAR system(s) 210 and multiple other systems including a vehicle perception and planning system 220. LiDAR system(s) 210 can be mounted on a vehicle. System(s) 210 are sensor(s) that scan laser light to the surrounding environment to measure the distance, angle, and velocity of objects. Based on the scattered light returned to LiDAR system(s) 210, it can generate sensor data (e.g., image data or 3D point cloud data) representing the perceived external environment. LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems can have several seconds (e.g., 6-8 seconds) to respond to any situations detected by the LiDAR sensor. As shown in FIG. 2, in one embodiment, the LiDAR sensor data are provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensors 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting some situations (e.g., an intersection with traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensors(s) 230 can also include radar sensor(s) 234. Radar sensor(s) 234 use radio waves to determine the range, angle, and velocity of objects. Radar sensor(s) 234 produces electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar and a long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations. In some embodiments, one or more other sensor(s) 238 may be attached in a vehicle and may also generate sensor data. Other sensor(s) 238 may be, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc., and can communicate and share sensor data with one another. Communications between vehicles are also referred to as V2V (vehicle to vehicle) communications. For example, as shown in FIG.

2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a vehicle A may not sense a pedestrian that is a behind a vehicle B but is approaching vehicle A. Vehicle B may share the sensor data related to this pedestrian with vehicle A such that vehicle A can have additional reaction time to avoid collision with the pedestrian. In some embodiments, similar to data generated by Sensor(s) 230, sensor data generated by other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures may generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because the some of its own sensors may be blocked by traffics in the opposite direction. In such a situation, sensors of intelligent infrastructure system(s) 240 can provide useful, and sometimes vital, data to a left-turning vehicle. Such data may include, for example, traffic conditions, objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both the camera 232 and the LiDAR system 210, and use the sensor data provided by the LiDAR system 210 to compensate the unclear image captured by the camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus can be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object will collide with the vehicle. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network-based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, driving behaviors planner, and motion planner. Route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. Motion planner determines the specific operations the vehicle needs to follow. The planning results are then communicated to vehicle control system 280 via vehicle interface 270. The communication can be performed through communication paths 223 and 271, which can include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which can include any wired or wireless communication links that can transfer data. It is understood that the various systems, sensors, and interfaces in FIG. 2 can be configured in any desired manner and not limited to the configuration shown in FIG. 2.

Figure 3:
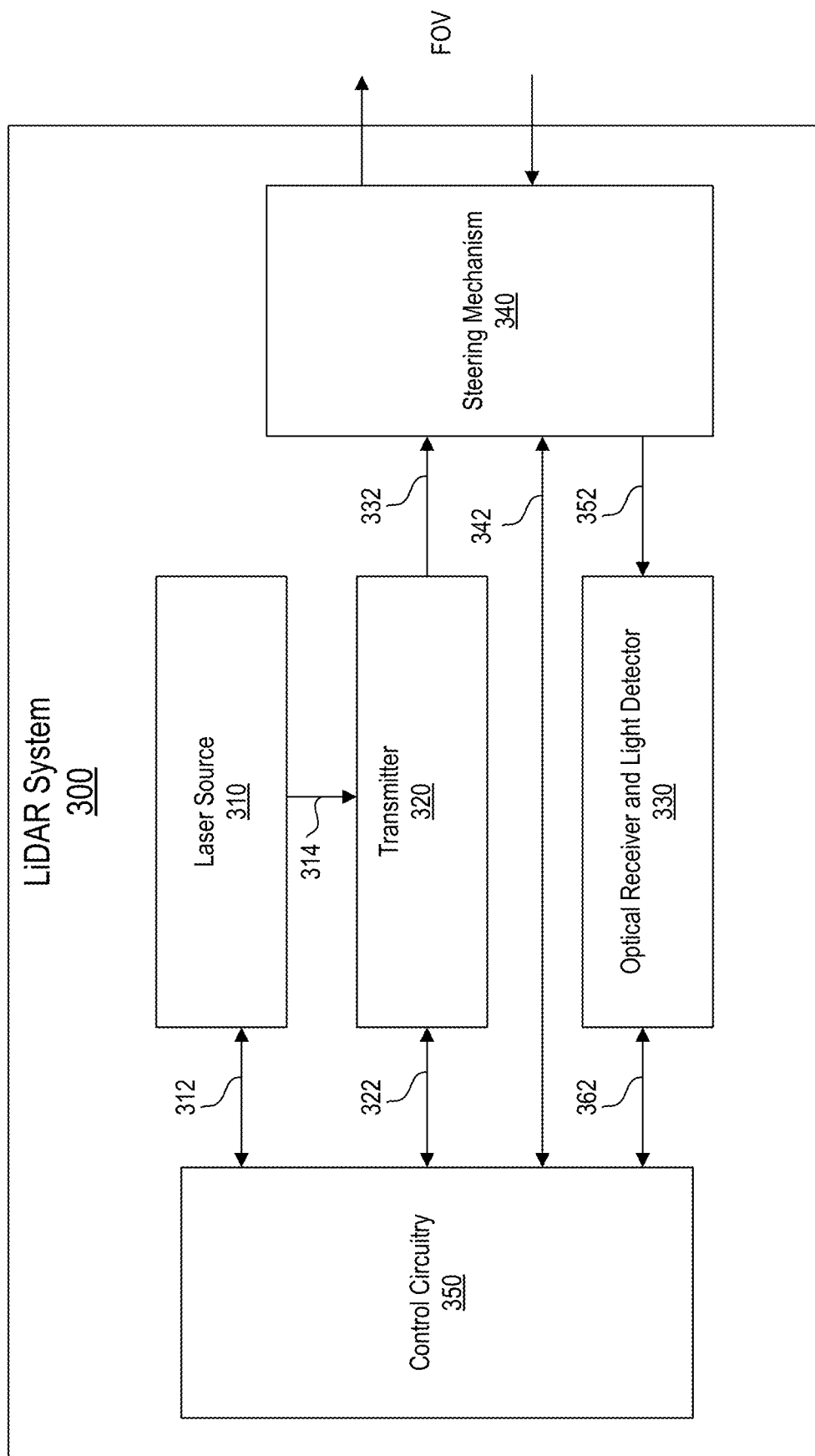
FIG. 3 is a block diagram illustrating an exemplary LiDAR system.

FIG. 3 is a block diagram illustrating an exemplary LiDAR system 300. LiDAR system 110, 120A-H, and 210 shown in FIGS. 1 and 2 can be implemented using LiDAR system 300. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communication paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented free space optical components and/or optical fibers. And communication paths 312, 322, 342, and 362 may be implemented using one or more electrical wires that carry electrical signals. The communications paths can also include more than one of the above types of communication mediums (e.g., they can include an optical fiber and an optical path or one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high-power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a solid-state bulk laser or a tunable external-cavity diode laser. In some embodiments, laser source 310 can be an optical pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., $ND:YVO_4$) laser crystals.

Figure 4:
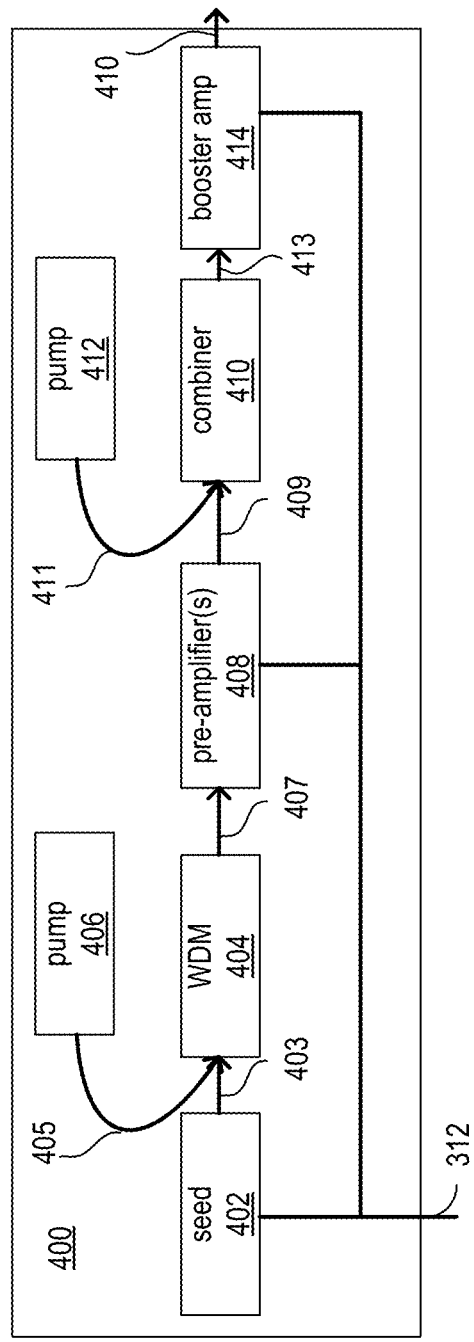
FIG. 4 is an exemplary block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. The output of WDM 404 can then be provided to one or more pre-amplifier(s) 408 via optical fiber 407. Pre-amplifier(s) 408 output to a combiner 410 via an optical fiber 409. Combiner 410 takes laser power from a pump 412 via an optical fiber 411 and provides pulses to a booster amplifier 414, which produces output light pulses via optical fiber 410. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Typical operating wavelengths of laser source 310 comprise, for example, about 850 nm, about 905 nm, about 940 nm, about 1064 nm, about 1310 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. Peak power is the ratio of pulse energy to the width of the pulse (e.g., full width at half maximum or FWHM). Therefore, a smaller pulse width can provide a larger peak power for a fixed amount of pulse energy. A pulse width can be in the range of nanosecond or picosecond. Average power is the product of the energy of the pulse and the pulse repetition rate (PRR). As described in more detail below, the PRR represents the frequency the pulsed laser light. PRR typically corresponds to the maximum range that a LiDAR system can measure. Laser source 310 can be configured to produce pulses at high PRR to meet the desired number of data points in a point cloud generated by the LiDAR system. Wall plug efficiency (WPE) is another factor to evaluate the total power consumption, which may be a key indicator in evaluating laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often essential in selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources, such as laser diodes, short-cavity fiber lasers, solid-state lasers, and/or tunable external cavity diode lasers, that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals.

With reference back to FIG. 3, LiDAR system 300 further comprises a transmitter 320. Laser light (e.g., in the form of a laser beam) is provided from laser source 310 to transmitter 320. The laser light provided by laser source 310 can be amplified laser light with a predetermined or controlled wavelength, repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate blocks, they may be combined or integrated as one system in some embodiments. Steering mechanism 340 is described in more detail below.

A laser beam provided by laser source 310 may diverge as it travels to transmitter 320. Therefore, transmitter 320 often comprises a collimating lens configured to collect the diverging laser beams and produces a parallel optical beam with reduced or minimum divergence. The parallel optical beam can then be further directed through various optics such as mirrors and lens. A collimating lens may be, for example, a plano-convex lens. The collimating lens can be configured to have any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to control good laser beam quality in generated a transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. The smaller the $M^2$ factor, the tighter the focus of the laser beam and the more intense a beam spot can be obtained. Therefore, laser source 310 and/or transmitter 320 can be configured to obtained desired $M^2$ factor according to, for example, a scan resolution requirement.

The light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light return to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a receiver lens or focusing lens (e.g., a plano-convex lens) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise a APD (avalanche photodiode) based structure, a PMT (photomultiplier tube) based structure, a SiPM (Silicon photomultiplier) based structure, a SPAD (single-photon avalanche diode) base structure, and quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the detector's internal gain. Common noise includes signal shot noise, dark current shot noise, thermal noise, and amplifier noise (TIA). Therefore, optical receiver and light detector 330 may include a pre-amplifier that is a low noise amplifier (LNA). In some embodiments, the pre-amplifier may also include a TIA-transimpedance amplifier, which convert a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of the LiDAR system 300. Such optimization techniques may include selecting different detector structures, materials, and/or implement signal processing techniques (e.g., filtering, noise reduction, etc.). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism may also be referred to as a raster mechanism or a scanning mechanism. Scanning light beams in multiple dimensions (e.g., in both the horizontal and vertical dimension) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include MEMS mirror-based steering, optical phased arrays based steering, and flash LiDAR based steering. In some embodiments, because solid-state scanning mechanisms does not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to the optical receiver and light detector 330. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

With reference still to FIG. 3, LiDAR system 300 further comprises control circuitry 350. Control circuitry 350 can be configured and/or programmed to control various part of the LiDAR system 300 and/or to perform signal processing. In a typical system, control circuitry 350 can be configured and/or programmed to perform one or more controlling functions including, for example, controlling the laser source 310 to obtain desired laser pulse timing and power, controlling the steering mechanism 340 (e.g., controlling the speed, direction, and/or other parameters) to scan the FOV and maintain pixel registration/alignment, controlling optical receiver and light detector 330 (e.g., controlling the sensitivity, noise reduction, filtering, and/or other parameters) such that it is an optimal state, and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the transmitted direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidities, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, Ingress Protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that the FIG. 3 and the above descriptions are for illustration only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 is one or more optical fibers, communication path 352 represents an optical path, and communication paths 312, 322, 342, and 362 are all one or more electrical wires that carry electrical signals. The communications paths can also include more than one of the above types of communication mediums (e.g., they can include an optical fiber and an optical path or one or more optical fibers and one or more electrical wires).

Figure 5A:
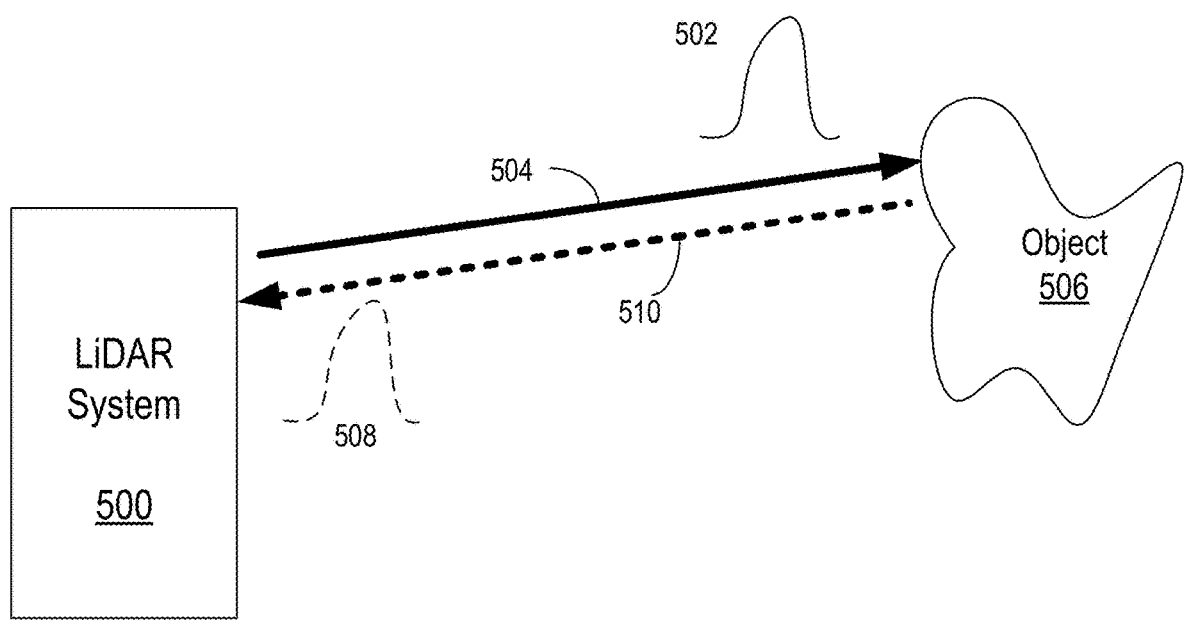
FIGS. 5A-5C illustrate an exemplary LiDAR system using pulse signals to measure distances to objects disposed in a field of view.

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (a time-of-flight LiDAR system that uses light pulses) when light pulse 502 reaches object 506, light pulse 502 scatters or reflects to generate a return light pulse 508. Return light pulse 508 may return back to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
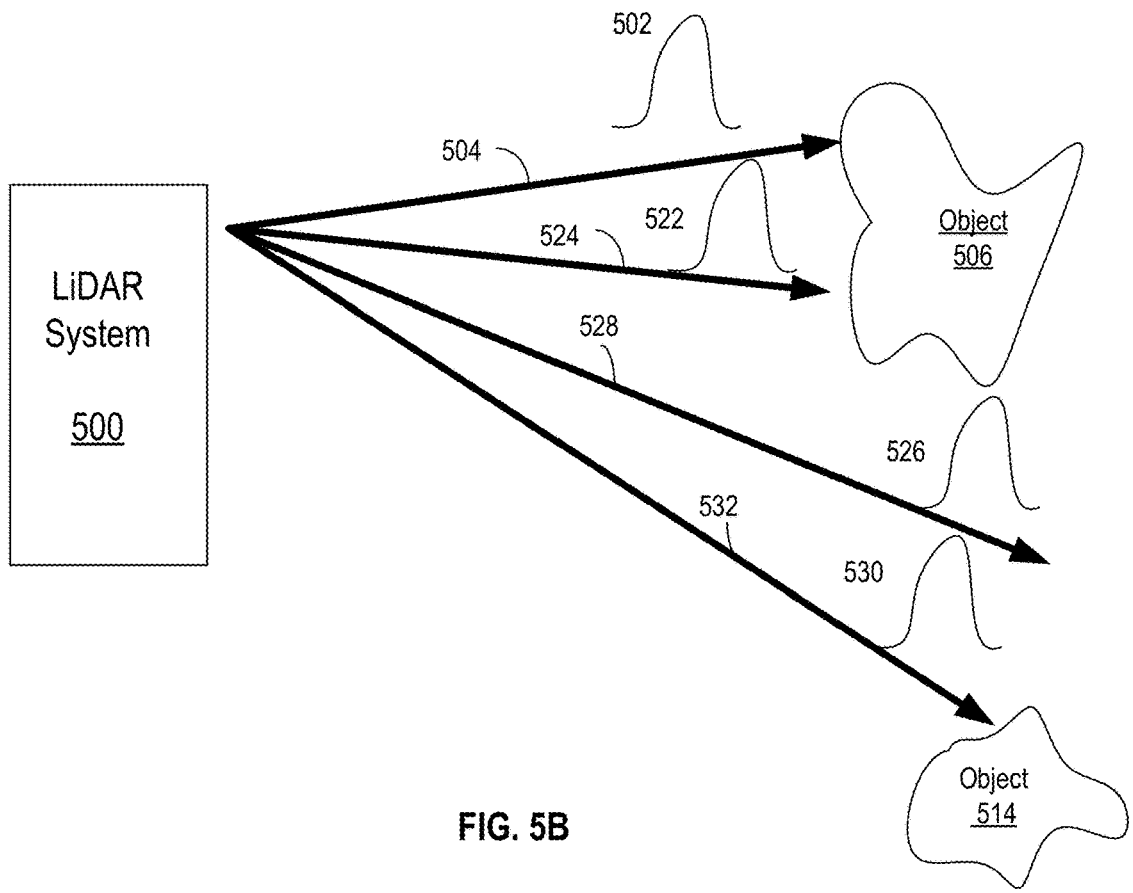
Figure 5C:
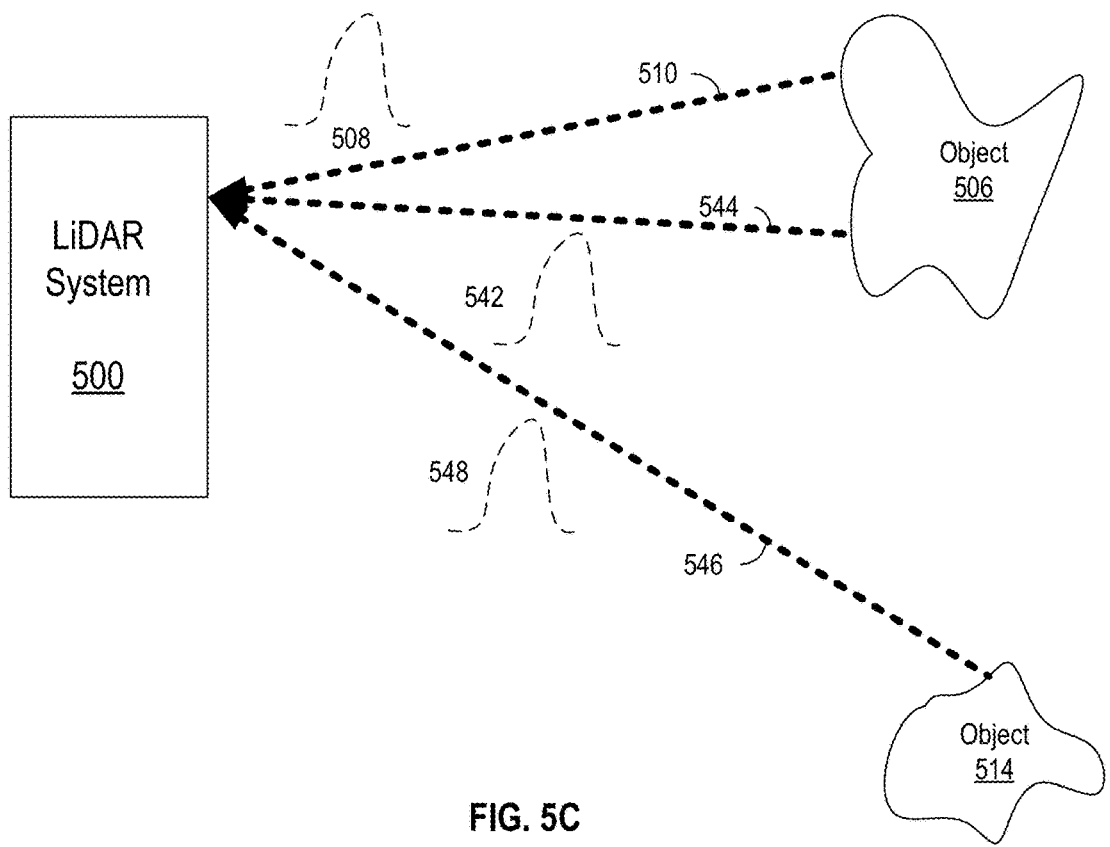

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detection range of LiDAR system 500.

In FIG. 5B, transmitted light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also directed transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range to objects). Similarly, a point cloud or image from a 2-dimensional transmission of light pulses can generate 3-dimensional data (e.g., (1) data from the horizontal transmission direction, (2) data from the vertical transmission direction, and (3) the range to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per angular area performed by the LiDAR system. A point cloud density relates to the LiDAR scanning resolution. Typically, higher resolution is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) would reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
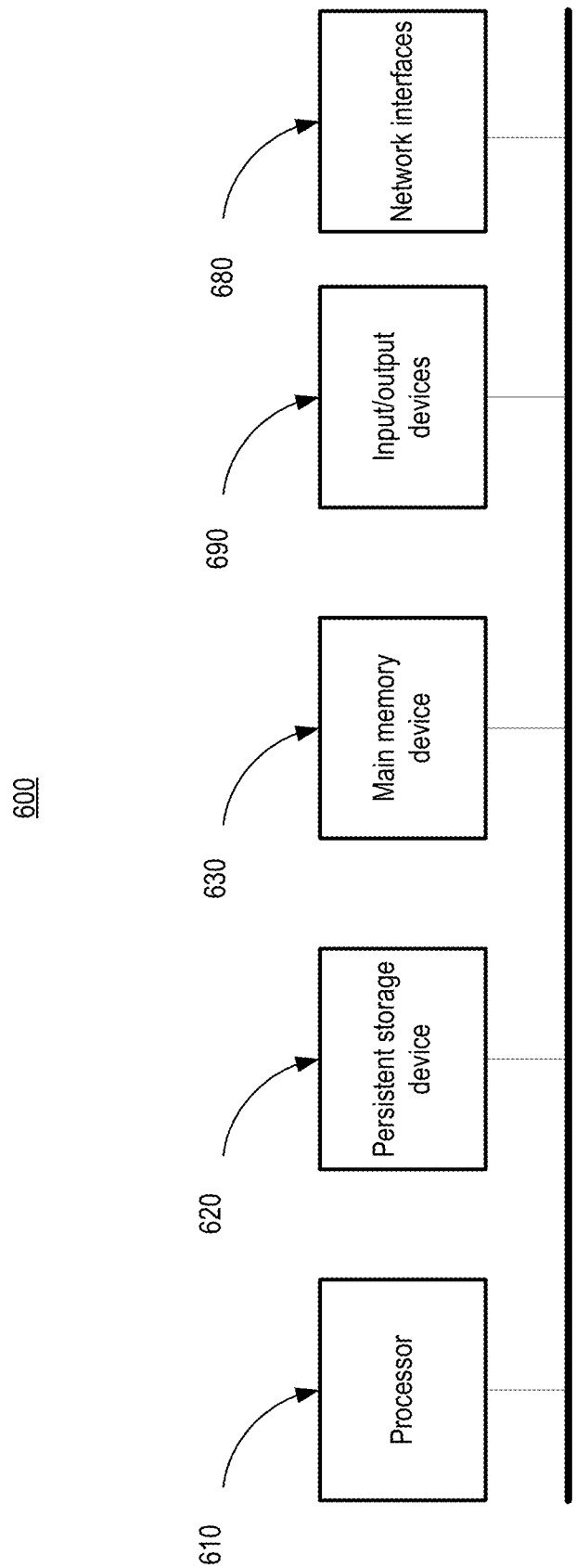
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Various methods described in this disclosure can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by various methods described in this disclosure. Accordingly, by executing the computer program instructions, the processor 610 executes algorithm(s) defined various methods described in this disclosure. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
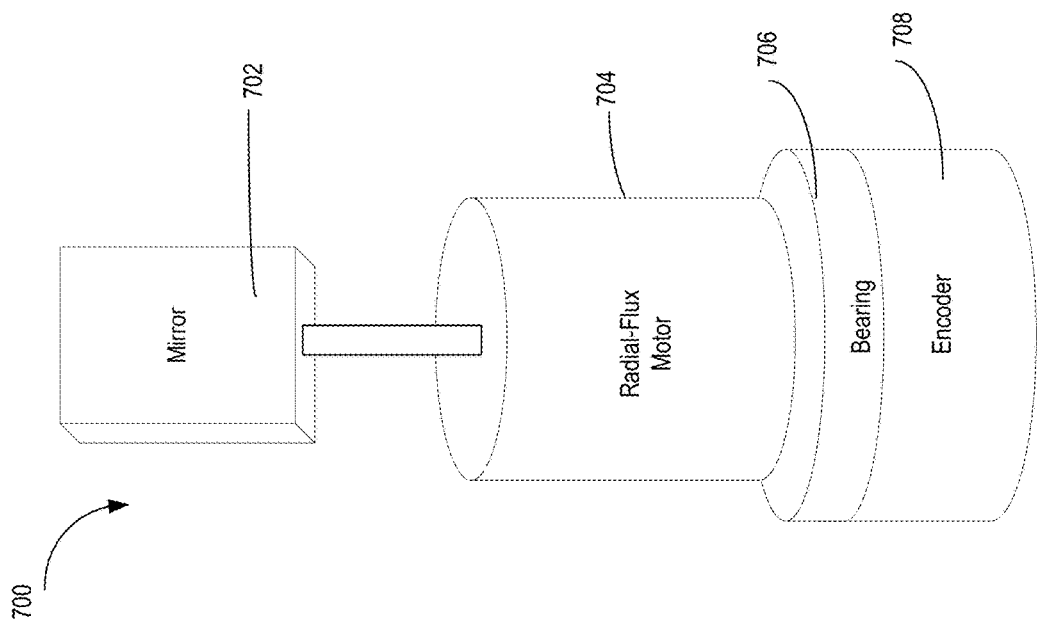
FIG. 7 illustrates a traditional galvanometer device.

FIG. 7 illustrates a conventional galvanometer device 700. A galvanometer device can rotate a mirror to steer laser beams and is used in, for example, laser scanning, printing, medical instruments, laser cutting, and optical projection. Device 700 includes a mirror 702, a radial-flux motor 704, a bearing 706, and an encoder 708. Conventionally, as shown in FIG. 7, the radial-flux motor 704, bearing 706, and encoder 708 are all mounted on the same side of mirror 702. In other words, mirror 702 is mounted at one end of galvanometer device 700. A traditional galvanometer device 700 is thus a single-ended device. Typically, device 700 is typically mounted on a stable foundation or used in a quiet operating environment where there is no or minimum mechanical or thermal disturbance. Nowadays, galvanometer devices are increasing used in a vehicle as part of a LiDAR system. The operating environment of a vehicle, however, is quite different from those environments in which a traditional galvanometer device is used. A vehicle may generate significant shock or vibration when it is operating at high speed or in an off-road condition. It may also need to operate in a wide temperature and humidity range and/or in a dusty/foggy/rainy/snowy environment. In other words, the operating environment of a vehicle can vary significantly from time to time. A traditional galvanometer device such as device 700 shown in FIG. 7 may thus not work well or may not work at all when it is mounted to a vehicle.

Specifically, using device 700 as an example, because mirror 702 is mounted at one end of the device, mirror 702 may have bending or shaking along the radial direction if the device is operating in a highly vibrating environment. The bending or shaking of the mirror 702 generates scanning deviations of the laser beams, which in turn generates errors in the image or the point cloud. Further, the dimension of a radial-flux motor 704 is usually large in its longitudinal direction (vertical direction as shown in FIG. 7). The bearing 706 and encoder 708 are mounted to radial-flux motor 704 along the longitudinal direction as well. Therefore device 700 can be quite long and it may be difficult to fit device 700 to a small space in a vehicle. Moreover, windings of radial-flux motor 704 in a traditional galvanometer device 700 are usually made manually and inserted into the case of radial-flux motor 704. This manual process prevents manufacturing of a traditional galvanometer device in a high volume, which is normally a requirement for automotive manufacturing. Furthermore, encoder 708 and radial-flux motor 704 in the traditional galvanometer device 700 are disposed close to each other. As a result, the noise generated from radial-flux motor 704 can negative affect the performance of encoder 708.

Figure 8A:
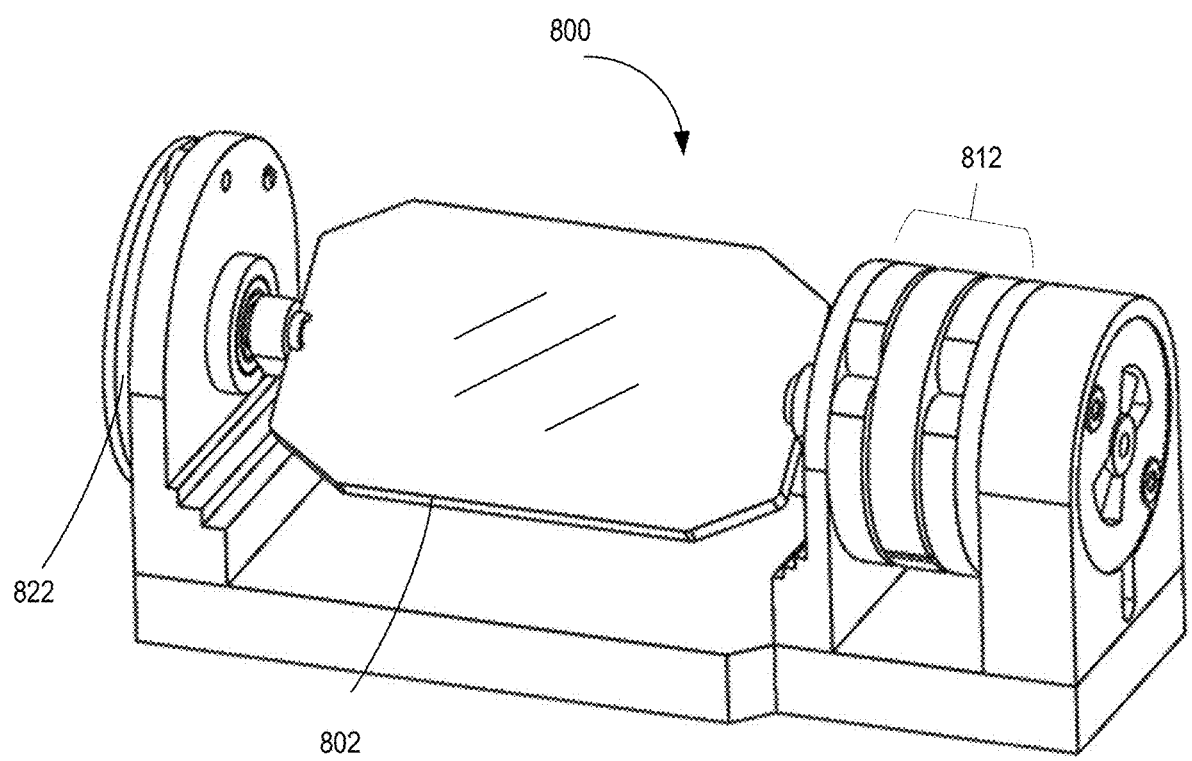
FIGS. 8A-8B are perspective views of an exemplary motorized optical scanner according to some embodiments.
Figure 8B:
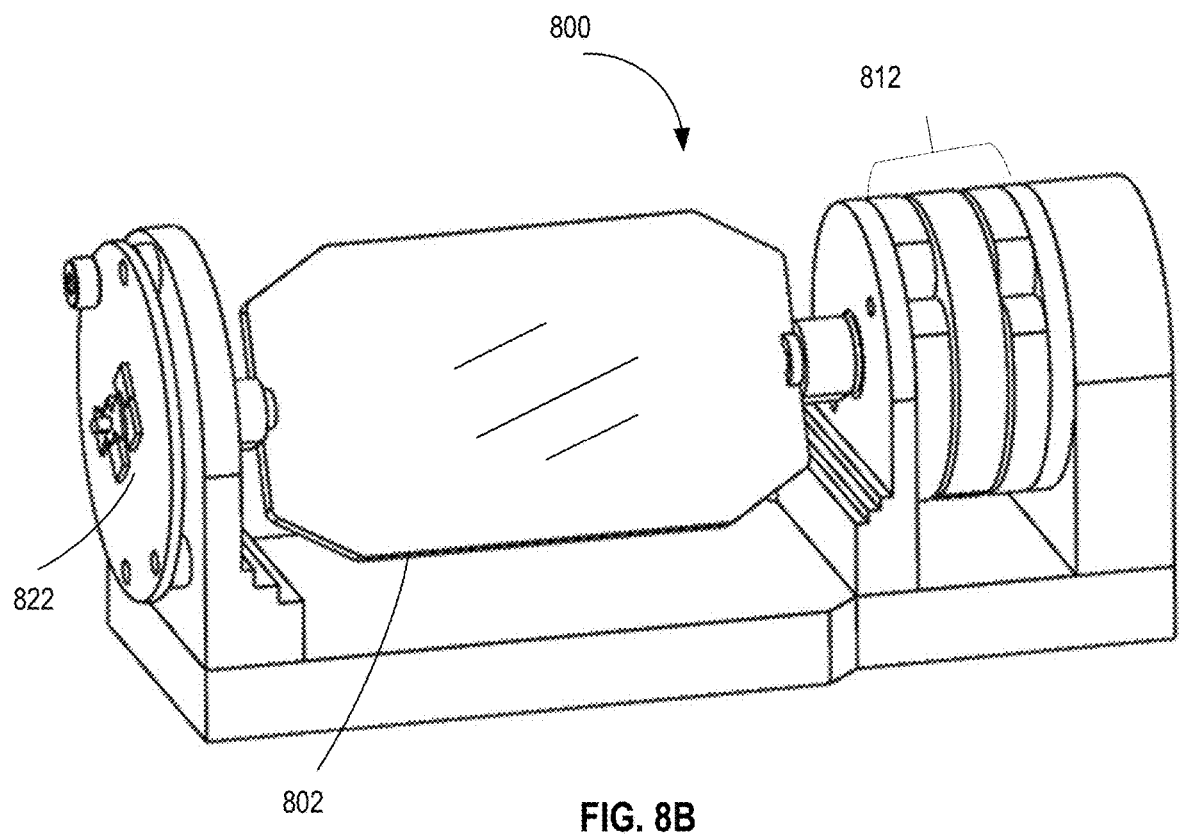
Figure 9A:
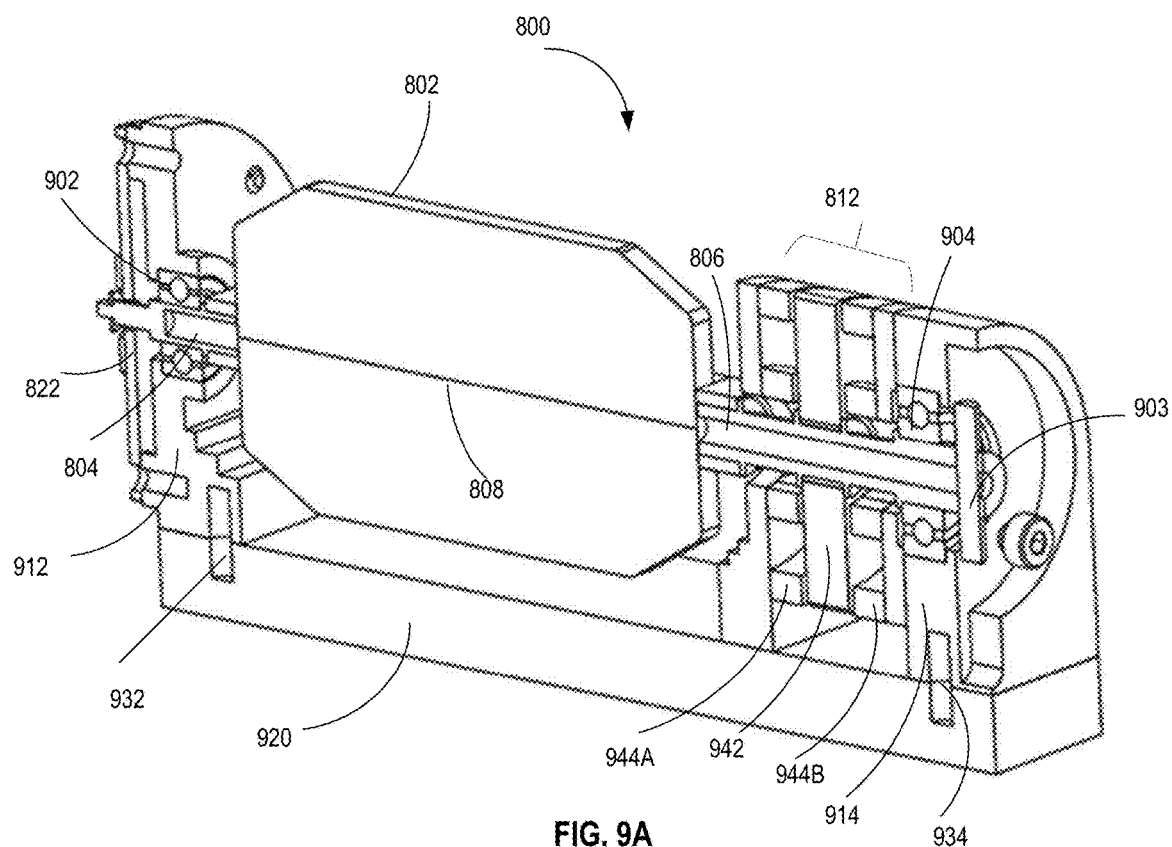
FIG. 9A is a cross-sectional perspective view of the exemplary motorized optical scanner in FIGS. 8A-8B.
Figure 9B:
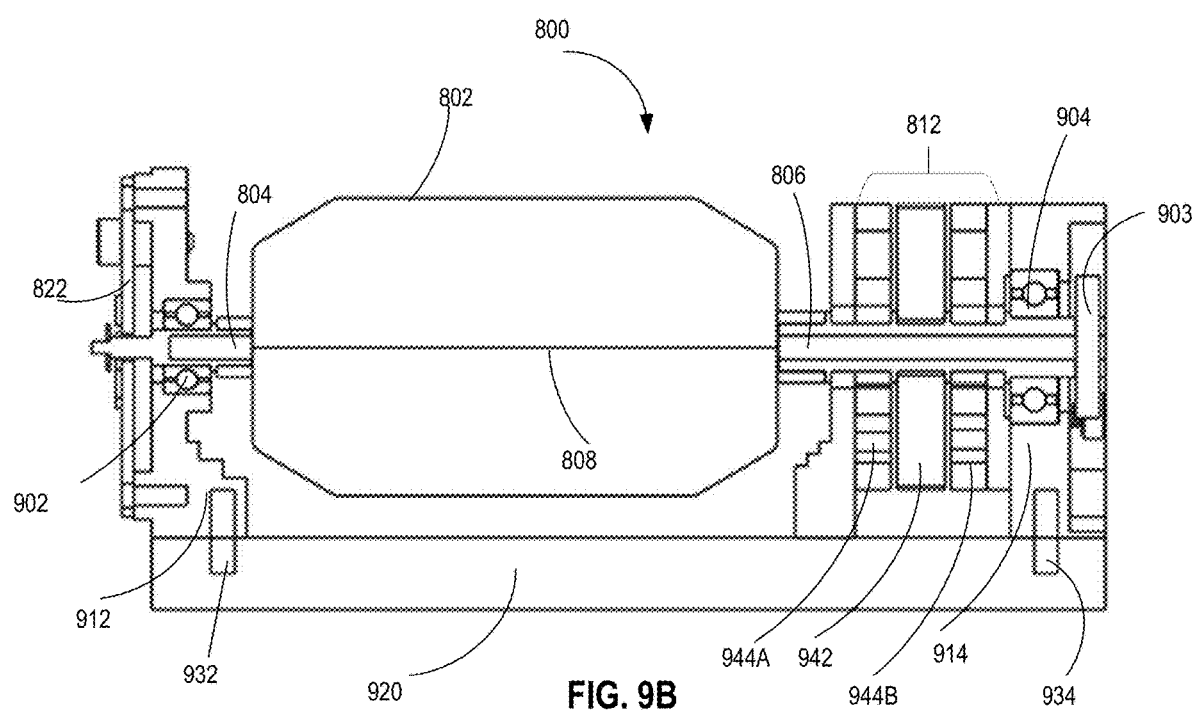
FIG. 9B is a cross-sectional view of the exemplary motorized optical scanner in FIGS. 8A-8B.
Figure 10A:
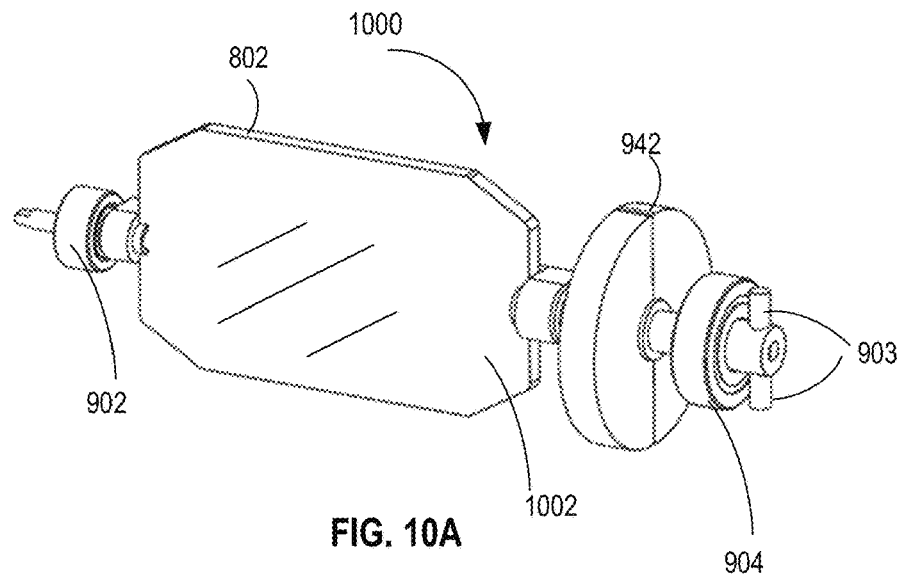
FIGS. 10A-10B are perspective views illustrating an exemplary rotor assembly of the motorized optical scanner in FIGS. 8A-8B.
Figure 10B:
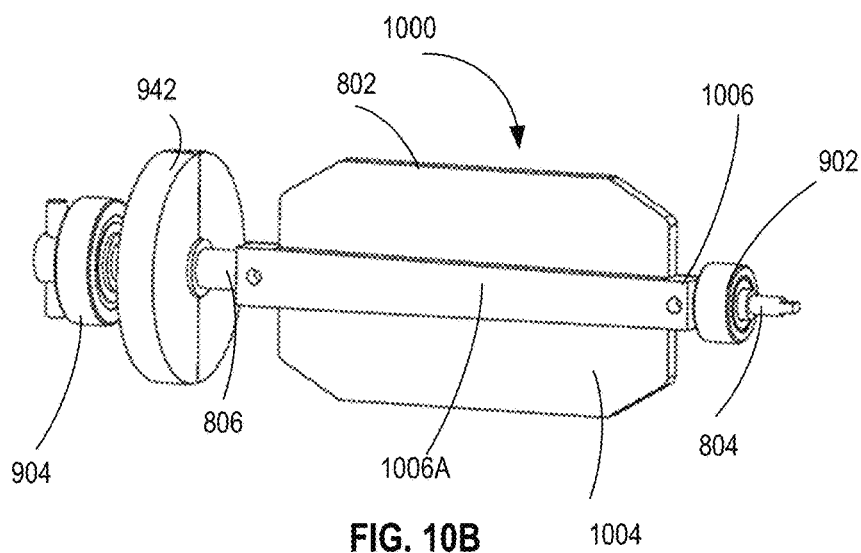
Figure 10C:
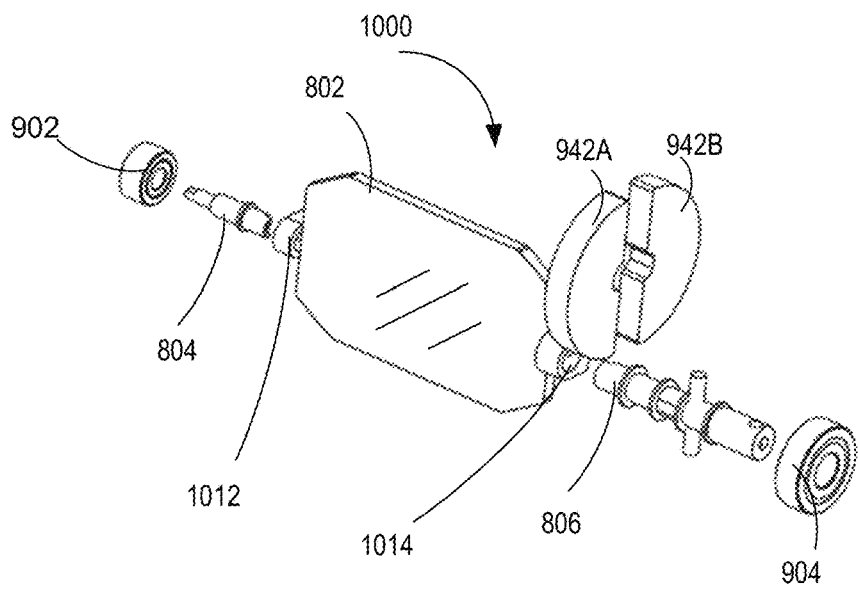
FIG. 10C is an exploded view illustrating an exemplary rotor assembly of the motorized optical scanner in FIGS. 8A-8B.
Figure 11:
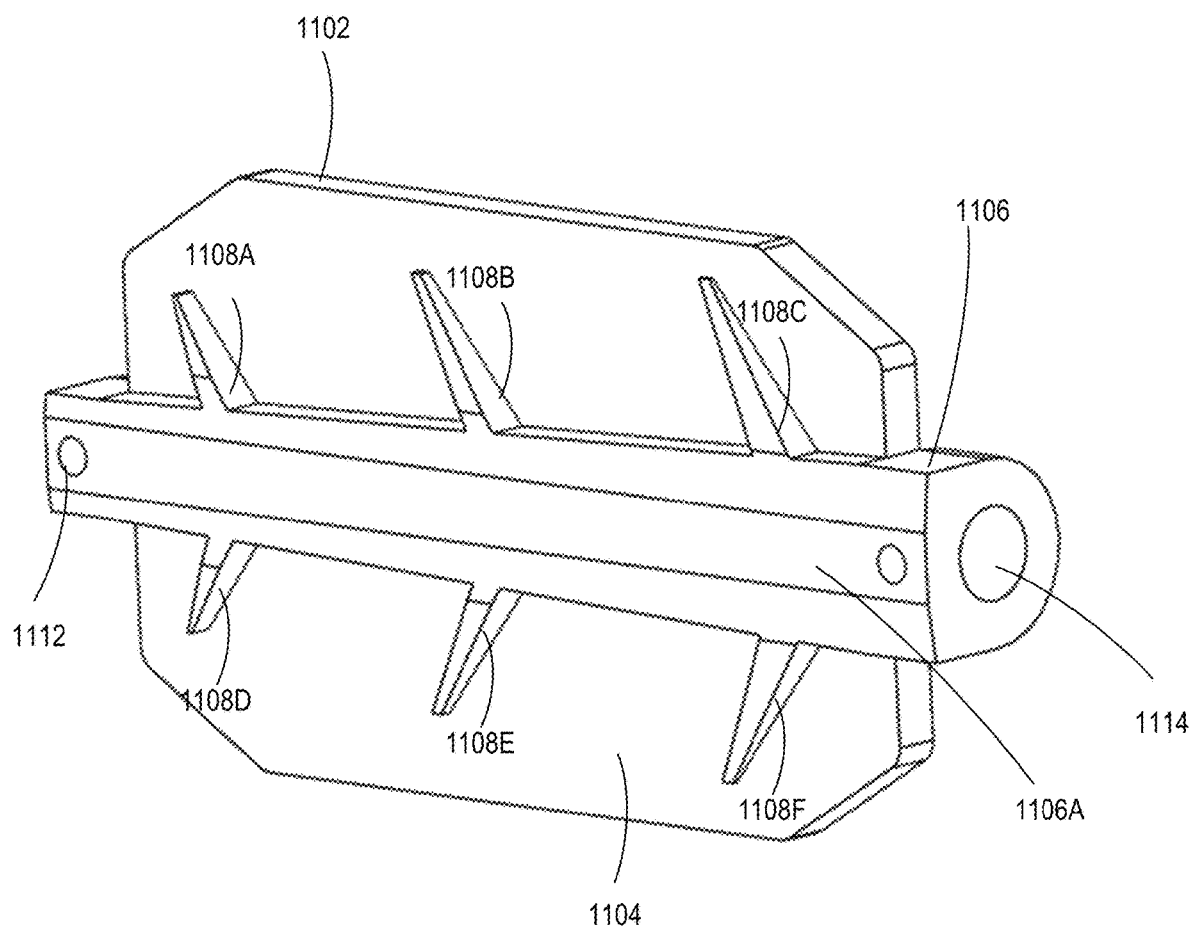
FIG. 11 is a perspective view illustrating an exemplary shaft mounting fixture of the dual shaft motorized optical scanner.
Figure 12A:
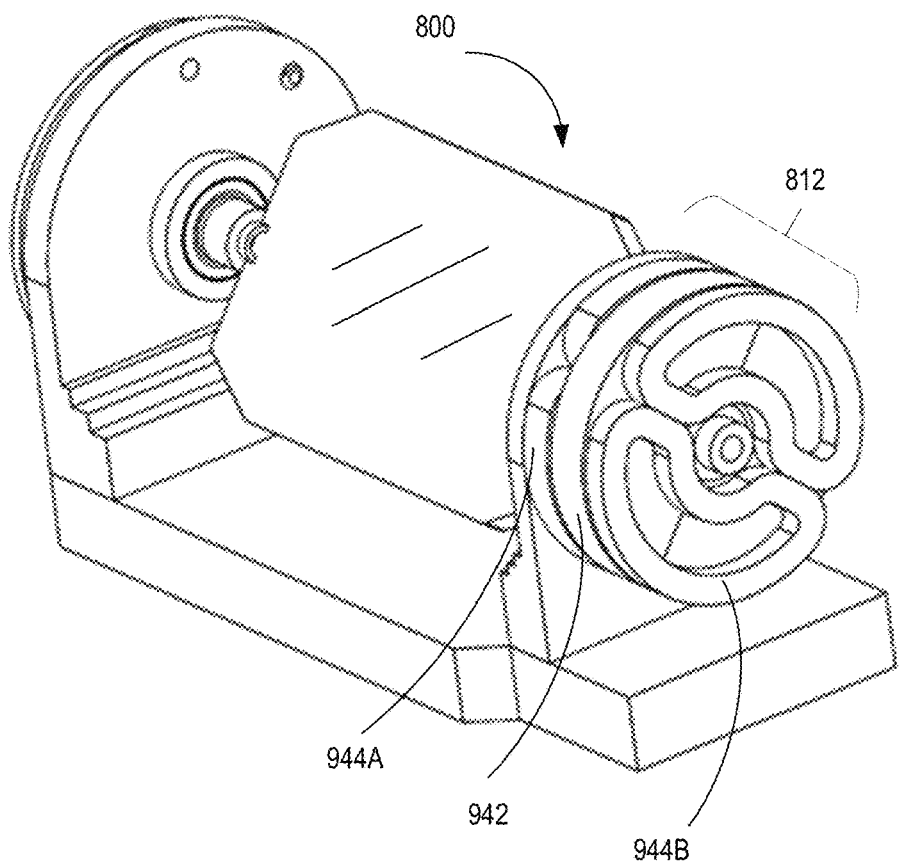
FIG. 12A is a perspective view illustrating an exemplary motorized optical scanner according to some embodiments.
Figure 12B:
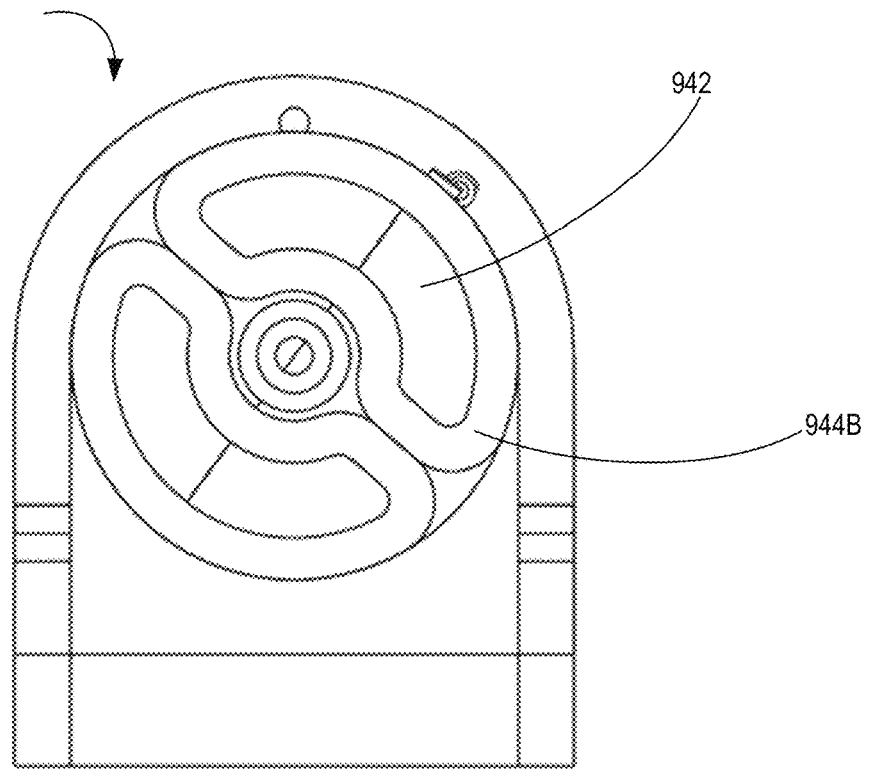
FIG. 12B is a side view illustrating an exemplary an exemplary motorized optical scanner according to some embodiments.

Embodiments of the present invention are illustrated using FIGS. 8A-8B, 9A-9B, 10A-10C, and 11. FIGS. 8A-8B are perspective views of an exemplary motorized optical scanner 800. FIG. 9B is a cross-sectional view of the exemplary motorized optical scanner 800 in FIGS. 8A-8B. FIGS. 10A-10B are perspective views illustrating an exemplary rotor assembly 1000 of the motorized optical scanner 800 in FIGS. 8A-8B. FIG. 10C is an exploded view illustrating an exemplary rotor assembly 1000 of the motorized optical scanner 800 in FIGS. 8A-8B. FIG. 11 is a perspective view illustrating an exemplary shaft mounting fixture 1106 of a dual shaft motorized optical scanner. FIGS. 8A-8B, 9A-9B, 10A-10C, and 11 are described together below. Same elements in different FIGS. 8A-8B, 9A-9B, 10A-10C, and 11 are labelled with same numbers. Motorized optical scanner 800 can be, for example, a part of steering mechanism 340 of LiDAR system 300 shown in FIG. 3.

With reference to FIGS. 8A-8B, 9A-9B, and 10A-10C, motorized optical scanner 800 comprises a reflective piece 802. As shown in FIGS. 10A and 10B, reflective piece 802 can include a substrate 1004 and a reflective surface 1002. The reflective surface 1002 can be mechanically or adhesively mounted to the front side of the substrate 1004. For example, the reflective surface 1002 may be a mirror that is mounted to a separate substrate 1004. Substrate 1004 can be made of any materials with sufficient hardness or strength to support reflective surface 1002 under a wide variety of environment conditions. Substrate 1004 can be made of, for example, metal, alloy, rubber, plastic, etc. In some embodiments, the substrate 1004 and the reflective surface 1002 can be integral parts of reflective piece 802. Reflective piece 802 may have chamfered corners as shown in FIGS. 10A-10B. Reflective piece 802 may also have any other type of shapes and corners (e.g., a rectangle shape with no chamfered corners, a round shape, a square shape, rounded corners, etc.).

In some embodiments, reflective surface 1002 and substrate 1004 can be made of different materials. For example, reflective surface 1002 can be a mirror made of glass with a reflective coating. Substrate 1004 can be made of metal (e.g., aluminum), silicon-carbide, or any other materials that can provide desired support to reflective surface 1002. Reflective surface 1002 and substrate 1004 can also be CNC (computer numerical control) milled or molded, separately or together. For example, a mirror and its substrate can be molded or machine-manufactured together. Using machines, several processing steps can be performed such that the mirror is coarsely processed first followed by a fine polishing step to provide an optically reflective surface.

Reflective piece 802 can be controlled to rotate or oscillate about an axis 808 (e.g., an axis along the center line in the longitudinal direction of reflective piece 802 shown in FIGS. 9A-9B) to facilitate scanning of laser beams. In some embodiments, as shown in FIGS. 9A, 9B, and 10C, reflective piece 802 is mounted to a first shaft 804 and a second shaft 806. First shaft 804 and second shaft 806 can be mounted in a manner such that they define the axis 808 about which reflective piece 802 rotates or oscillates. For example, first shaft 804 and second shaft 806 can be mounted to the center position of the respective edges of reflective piece 802 such that they are aligned with a center axis 808 of reflective piece 802 in the longitudinal direction. As shown in FIG. 10B, first shaft 804 and second shaft 806 are attached to a first end and a second end of substrate 1004 respectively. The first end and the second end of substrate 1004 are opposite ends of the substrate 1004 along a longitudinal direction of the substrate 1004. This configuration makes reflective piece 802 to be positioned between first shaft 804 and second shaft 806, forming a dual-shaft structure. In other words, reflective piece 802 is positioned in the middle of motorized optical scanner 800 (shown in FIGS. 8A-8B), in contrast to being positioned at one end like a traditional single-ended galvanometer device. A dual-shaft structure improves the mechanical robustness and operability of the motorized optical scanner 800.

In some embodiments, first shaft 804 and second shaft 806 are attached to substrate 1004 through a shaft-mounting fixture 1006 shown in FIG. 10B. Shaft-mounting fixture 1006 can be mechanically (e.g., using fasteners, clamps, etc.) or adhesively attached to substrate 1004. Shaft-mounting fixture 1006 can also be an integral part of substrate 1004. For example, shaft-mounting fixture 1006 and substrate 1004 can be manufactured together as one piece by using molding techniques. As shown in FIGS. 10A and 10B, the backside of substrate 1004 is attached to shaft-mounting fixture 1006 while the front side of substrate 1004 is attached to reflective surface 1002.

In some embodiments, as shown in FIG. 10C, shaft-mounting fixture 1006 comprises two mounting holes 1012 and 1014. First shaft 804 and second shaft 806 are attached to shaft-mounting fixture 1006 by inserting them into the mounting holes 1012 and 1014 respectively and securing them with shaft-mounting fixture 1006. Similarly, shaft-mounting fixture 1106 shown in FIG. 11 also comprises two mounting holes 1112 and 1114. First shaft 804 and second shaft 806 can be attached to shaft-mounting fixture 1106 by inserting them into the mounting holes 1112 and 1114 respectively and securing them with shaft-mounting fixture 1106. By mounting the first shaft 804 and second shaft 806 to the shaft-mounting fixture 1006 or 1106, the rotation or oscillation of second shaft 806 (caused by a motor 812 as described in more detail below) causes reflective piece 802 to rotate or oscillate so that laser beams can be scanned using reflective piece 802. In turn, the rotation or oscillation of reflective piece 802 causes first shaft 804 to rotated or oscillated. As described above, the dual-shaft structure strengthens the support of reflective piece 802 to improve robustness, operability, and reliability.

FIGS. 10A and 10B illustrate shaft-mounting fixture 1006 as having a bar-shaped support member 1006A for providing mechanical support of reflective piece 802. FIG. 11 illustrates another embodiment of a shaft-mounting fixture 1106. Shaft-mounting fixture 1106 is attached or mounted to the backside of substrate 1104 of a reflective piece 1102. Similar to reflective piece 802, reflective piece 1102 also comprises a reflective surface (not shown) and substrate 1104. Substrate 1104 is attached to shaft-mounting fixture 1106 mechanically or adhesively. Unlike shaft-mounting fixture 1006, shaft-mounting fixture 1106 comprises a support member 1106A and plurality of protrusions 1108A-F for strengthening the support of substrate 1104. Protrusions 1108A-F can be mechanically attached to shaft-mounting fixture 1106 or manufactured together with support member 1106A as an integral piece. Protrusions 1108A-F can provide additional support for reflective piece 802 so to reduce bending, curving, or any type of distortion of reflective piece 802. It is understood that protrusions 1108A-F are just examples. Any other structures or shapes of shaft-mounting fixture can be used as well to strengthen the support of the reflective piece.

The dual shaft structure, the shaft-mounting fixture, and/or the protrusions are exemplary structural elements for strengthening or enhancing the support to a reflective piece in a motorized optical scanner. Strengthening the support to a reflective piece is beneficial because a reflective piece (e.g., 802) may be used in a wide variety of environments in which a vehicle may operate (e.g., hot or cold, humid or dry, dusty or foggy, etc.). The enhanced support provided by the dual shaft structure, the shaft-mounting fixture, and/or the protrusions reduces or eliminates any bending or distortion of reflective piece 802. In turn, it reduces or eliminates deviations or errors in scanning the laser beams by reflective pieces 802, and produces improved scanning results (e.g., more accurate, predictable, and/or higher quality images or point clouds).

FIGS. 9A-9B and 10A-10C further illustrate a first bearing 902 and a second bearing 904 coupled to first shaft 804 and second shaft 806 respectively. First shaft 804 and second shaft 904 can rotate or oscillate relative to first bearing 902 and second bearing 904, respectively. Movement of second shaft 806 causes reflective piece 802 to rotate or oscillate, thereby optically scanning one or more light beams to a field-of-view. In some embodiments, first bearing 902 and second bearing 904 are substantially concentric such that the rotation axis of first shaft 804 and second shaft 806 are aligned with each other and aligned with rotational axis 808 of reflective piece 802. For example, first bearing 902 and second bearing 904 are substantially concentric if their rotational axes are not misaligned by more than 1 milliradian (mrad). The alignment of first shaft 804, second shaft 806, and reflective piece 802 reduces error in scanning laser beams and improves the scanning range accuracy. For example, if the two shafts are not aligned with the rotational axis 808 of reflective piece 802, the scanning range in the direction reflective piece 802 is oriented (e.g., the vertical scanning range) may be shifted to one side and not symmetrical (e.g., it may be shifted more towards the road or sky when reflective piece 802 is mounted on a vehicle together with other components of a LiDAR system).

In some embodiments, in order to align first bearing 902 and second bearing 904 such that they are substantially concentric, some alignment mechanisms can be used. As shown in FIGS. 9A-9B, first bearing 902 and second bearing 904 can be mounted to, or a part of, a first bearing fixture 912 and second bearing fixture 914, respectively. First bearing fixture 912 and second bearing fixture 914 can be manufactured to have mounting spaces for accommodating first bearing 902 and second bearing 904. First bearing fixture 912 and second bearing fixture 914 can also be manufactured together with first bearing 902 and second bearing 904 as integral pieces, respectively. First bearing fixture 912 and second bearing fixture 914 are mounted to a base 920 of motorized optical scanner 800. In some embodiments, each of first bearing fixture 912 and second bearing fixture 914 comprises a separate alignment mechanism for aligning the at least the concentricity of first bearing 902 and second bearing 904. As shown in FIGS. 9A and 9B, one such alignment mechanism has two Dowel pin holes 932 and 934 included in first bearing fixture 912 and second bearing fixture 914 respectively. Dowel pin holes 932 and 934 are for accommodating Dowel pins, which are solid, headless, cylindrical metal rods that have been machined to specific tolerances. The Dowel pins can have very small allowable tolerances such that they facilitate precise alignments. Using Dowel pin holes 932 and 934, precise alignments between the bearing fixtures 912 and 914 can be achieved (e.g., their X-Y locations on base 920 are precisely aligned). This in turn can result in precise alignment of first bearing 902 and second bearing 904 in all dimensions because the positions of bearing fixtures 912/914 are precisely aligned on base 920. Precise alignment of first bearing 902 and second bearing 904 can include alignment of their concentricity such that first shaft 804 and second shaft 806 are also aligned.

With reference back to FIGS. 8A-8B and 9A-9B, motorized optical scanner 800 includes a position encoder 822. Unlike a traditional galvanometer device, position encoder 822 is disposed at the opposite end of motor 812. That is, position encoder 822 and motor 812 are disposed at the two sides of reflective piece 802. As shown in FIGS. 8A-8B and 9A-9B, in one embodiment, position encoder 822 is coupled to first shaft 804 and is located next to first bearing fixture 912. Thus, position encoder 822 and first bearing 902 are both coupled to first shaft 804, although at different portions of first shaft 804. By coupling to first shaft 804, position encoder 822 rotates when first shaft 804 rotates, providing an output corresponding to the rotation of first shaft 804. The output of position encoder 822 may be in terms of voltage pulses or absolute angular position. For example, position encoder 822 can be a rotary encoder that converts an angular position or motion of the first shaft 804 to an electrical signal. Because first shaft 804 is coupled to reflective piece 802, the output of position encoder 822 thus represents the position of reflective piece 802. The position of reflective piece 802 corresponds to, for example, a scanning position/angle (e.g., a vertical scanning position/angle) of motorized optical scanner 800. Thus, position encoder 822 provides signals that can be used to determine the reflective piece 802's position, rotational speed, phase, direction, or the like.

In some embodiments, position encoder 822 is located further away from reflective piece 802 than from first bearing 902. In other words, position encoder 822 is located at one end of motorized optical scanner 800. As described above, motor 812 is located at the other side of reflective piece 802. This configuration is different from the traditional galvanometer device shown in FIG. 7. As a result, motorized optical scanner 800 is more balanced than that of the traditional galvanometer device, which provides more robustness, reliability, and operability and reduces bending or distortion of reflective piece 802. Further, because position encoder 822 is located at the opposite side from motor 812, as shown in FIGS. 8A-8B, position encoder 822 is less susceptible to noise generated by motor 812. In some embodiments, when operating, motor 812 may generate a large current, which may cause increased noise affecting position encoder 822. By placing position encoder 822 at the other side far away from motor 812, position encoder 822's signal quality and integrity (e.g., improving the signal to noise ratio) and immunity to power noise can be improved.

In some embodiments, position encoder 822 comprises an optical emitter and an optical receiver (not shown). The optical emitter can be, for example, a laser diode or a light emitting diode (LED) based emitter. The optical emitter may provide light with a wavelength of about 940 nm. The vicinity of the 940 nm wavelength is often a desired wavelength because there is much less natural light around this wavelength due to atmospheric absorption. The optical receiver can be a photodiode array or phototransistor array. The optical emitter generates optical light, and the optical receiver array generates photocurrent. When first shaft 804 rotates, it can block or reflect partial of the optical light to affect the optical receiver's output. Thus, the position of the first shaft 804 (and therefore reflective piece 802) can be sensed by measuring the photocurrent generated by the optical receiver. An optical narrow band filter can be applied to the optical receiver to reject ambient light out of the emitter wavelength band.

Because the optical emitting power is affected by temperature (and/or other environment factors), in some embodiments, position encoder 822 includes an encoder emitter driving circuit (not shown) configured to control emitter current, reduce intensity error, and increase immunity to background noise. The emitter driving current can be dynamically controlled, by the emitter driving circuit, to make the receiver output stable in a wide temperature range. The emitter driving current (e.g., an LED-base emitter current) can be driven by a digital-to-analog converter (DAC) or by any suitable analog circuits. The emitter current can also be configured (e.g., chopped) to increase the signal immunity to background noise. For example, the emitter light can be controlled to turn on/off at a predetermined speed that is fast enough while the ambient light and dark current can be treated as constant. By sampling the optical receiver output both when the emitter light is turned on and when the emitter light is turned off, and then subtracting the receiver output at the emitter light off-state from that at the emitter light on-state, the impact of background noise (e.g., ambient light and dark current) can be removed. This improves the signal to noise ratio and increases the signal-immunity, resulting in a better position encoder performance. The encoder emitter driving circuit can be implemented by, for example, using control circuitry 350 shown in FIG. 3.

Position encoder 822 may also include an encoder receiver conditioning circuit (not shown) configured to further improve noise immunity to background noise including dark noise. Encoder emitter driving circuit and/or encoder receiver conditioning circuit may be included in motorized optical scanner 800 or may be separately placed in other part of a LiDAR system (e.g., in the control circuitry 350 of system 300). Encoder receiver conditioning circuit can include, for example, analog or digital filters. As one example, a low pass filter can be implemented to improve the immunity to outside noise. As another example, a high pass filter can be implemented to isolate the chopping frequency of the LED light to improve the ambient light resistance capability.

With reference to FIGS. 8A-8B, 9A-9B, and 12A-12B, motorized optical scanner 800 can further include an axial flux motor 812. An axial flux motor, also referred to as an axial flux electrical motor, an axial gap motor, or a pancake motor, is a type of electrical motor where a gap between a rotor and a stator (and therefore the direction of magnetic flux between them) is aligned parallel with the axis of rotation. As illustrated in FIGS. 9A-9B, 10A-10C, and 12A, for example, axial flux motor 812 comprises a rotor 942 and stators 944A and 944B. Stators 944A and 944B are arranged at the two sides of rotor 942. In some embodiments, rotor 942 comprises two axial magnetized half-cylinder magnets 942A and 942B (shown in FIG. 10C) coupled to second shaft 806. Stators 944A and 944B comprise electrically conductive windings or coils. When motor 812 is provided with electricity, the windings or coils generate electromagnetic force, which causes magnets 942A and 942B to move. And because magnets 942A and 942B are part of rotor 942, rotor 942 also moves. Rotor 942 is coupled to second shaft 806 and therefore the rotation or oscillation of rotor 942 causes second shaft 806 to rotate or oscillate as well. This in turn rotates or oscillates reflective piece 802 to scan light beams to an FOV.

In some embodiments, the windings of stators 944A and 944B are mounted to one or more metal plates such as steel plates. Steel plates can enhance the magnetic field strength and shield stray magnetic field for improved motor operation. The windings may be, for example, flat coils mounted on the stators. In some embodiments, at the motor 812 side, a shaft stopping mechanism 903 (shown in FIGS. 9A, 9B, and 10A) is installed at the end of second shaft 806. The shaft stopping mechanism 903 can be used to limit the rotational range of reflective piece 802. In certain LiDAR applications, for example, motorized optical scanner 800 is configured to scan only a specified range (e.g., a vertical range of about 70 degrees). Therefore, reflective piece 802 does not need to, and sometimes is undesired to, rotate more than the specified range. A shaft stopping mechanism can be used to stop second shaft 806 from rotating or oscillating further beyond a certain range, such that the specified scanning range is satisfied.

FIGS. 8A-8B, 9A-9B, 10A-10C, and 12A-12B illustrates one embodiment of an axial flux motor configuration. It is understood that many other configurations can also be used. For example, rotor 942 may not use two axial magnetized half-cylinder magnets 942A and 942B as shown in FIG. 10C. Instead, rotor 942 may include a metal plate or disc with a plurality of smaller piece of magnets mounted on one or more side surfaces of the metal plate or disc. As another example, instead of using two stators disposed on the two sides of the rotor, an axial flux motor can also have a center stator and two rotors disposed on the two sides of the center stator. The center stator can have windings mounted along the axial direction of the center stator. And the two rotors can have magnets mounted to the side surfaces of the rotors such that the direction of the magnetic flux between them is parallel to the axis of rotation.

In some embodiments, motor 812 also includes a motor control circuit (not shown) configured to control the axial flux motor 812 to rotate or oscillate the second shaft 806 such that the reflective piece 802 rotates or oscillates to scan one or more light beams to the field-of-view. The motor control circuit can be disposed with motor 812 or anywhere else such as in control circuitry 350 of LiDAR system 300 shown in FIG. 3. The motor control circuit can be programmed or configured to control, for example, motor 812's rotational speed, angle, phase, range, or the like.

Figure 13:
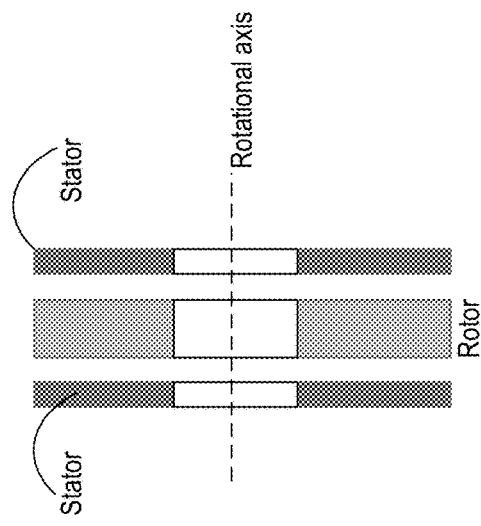
FIG. 13 illustrates an exemplary radial flux motor in comparison with an axial flux motor.
Figure 13:
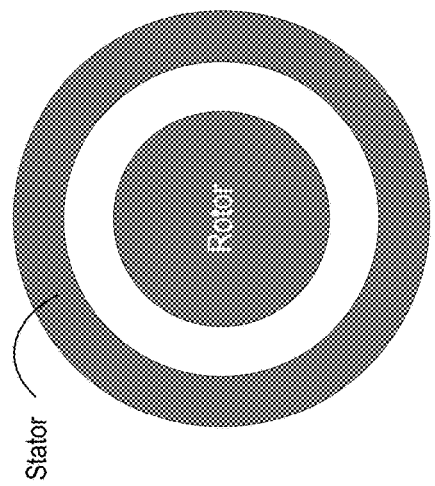
Figure 13:
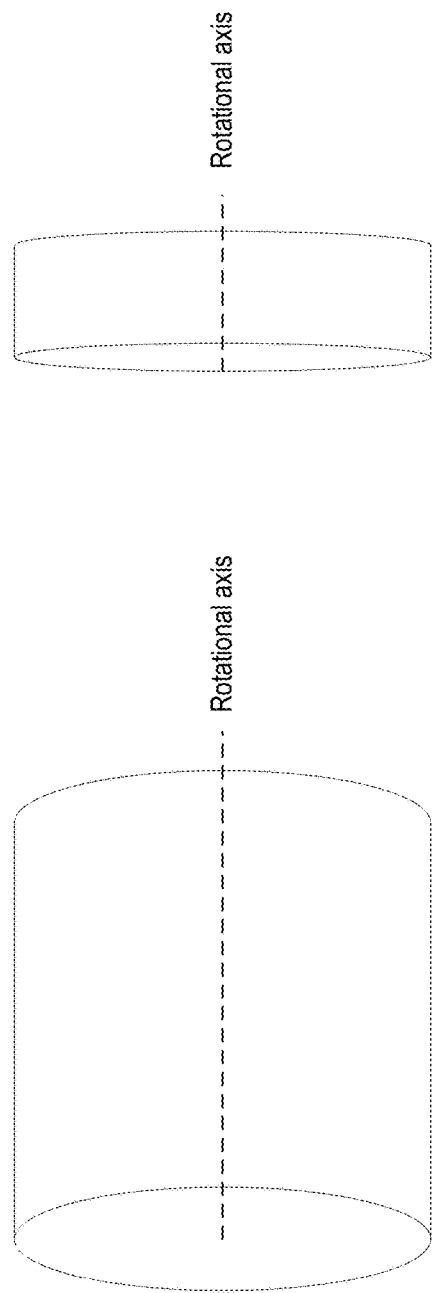

As described above, an axial flux motor (e.g., motor 812) is more compact at least in the axial direction than a radial flux motor. FIG. 13 illustrates a comparison between an axial flux motor and a radial flux motor. As shown in FIG. 13, for a radial flux motor, the configuration of the magnets and windings are such that the magnetic flux is parallel to the radial direction (i.e., perpendicular to the axial direction or the rotational axis of the motor). In contrast, an axial flux motor has the magnets and windings configured such that the magnetic flux is parallel to the axial direction (i.e., parallel to the rotational axis). The length of an axial flux motor can thus be significantly smaller than the length of a radial flux motor. Therefore, an axial flux motor can be more compact in size. An axial flux motor can thus be more easily fit into a compact LiDAR system, which is often mounted in certain small spaces in a vehicle (e.g., a corner of a vehicle, a side-view mirror, or another small compartment). In addition, for an axial flux motor, its windings and accessory components are also improved over radial flux motor. For instance, a traditional radial flux motor may have coil overhanging, which may negatively impact its performance. An axial flux motor has concentrated windings and does not have the same issue. Moreover, an axial flux motor inherently is more efficient because its magnetic flux path is shorter than a radial flux motor (which moves from a first tooth to the stator and then back to the next tooth). Cooling of an axial flux motor is also better than a radial flux motor because the windings can be in direct contact with an exterior metal casing. Therefore, using an axial flux motor in a motorized optical scanner (e.g., an improved galvanometer device) can be beneficial in several ways.

Various exemplary embodiments are described herein. Reference is made to these examples in a non-limiting sense. They are provided to illustrate more broadly applicable aspects of the disclosed technology. Various changes may be made, and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

The invention claimed is:

1. A motorized optical scanner of a Light Detection and Ranging (LiDAR) system used in a motor vehicle, comprising:
    a reflective piece including a substrate and a reflective surface;
    a first shaft and a second shaft attached to a first end and a second end of the substrate respectively, the first end and the second end being opposite ends of the substrate along a longitudinal direction of the substrate;
    a position encoder coupled to the first shaft, the position encoder being operative to monitor positions of the reflective piece; and
    a motor coupled to the second shaft, the motor being operative to move the second shaft, wherein movement of the second shaft causes the reflective surface to optically transmit one or more light beams to a field-of-view.

2. The motorized optical scanner of claim 1, wherein the reflective surface is a mirror mechanically or adhesively mounted to the front side of the substrate.

3. The motorized optical scanner of claim 1, further comprising a shaft-mounting fixture.

4. The motorized optical scanner of claim 3, wherein a backside of the substrate is attached to the shaft-mounting fixture.

5. The motorized optical scanner of claim 3, wherein the shaft-mounting fixture comprises a plurality of protrusions strengthening support of the substrate.

6. The motorized optical scanner of claim 3, wherein the shaft-mounting fixture comprises two mounting holes into which the first shaft and the second shaft are inserted.

7. The motorized optical scanner of claim 1, further comprising a first bearing coupled to the first shaft, wherein:
    the first bearing is coupled to a first portion of the first shaft;
    the position encoder is coupled to a second portion of the first shaft, the first portion and the second portion are different portions of the first shaft; and
    the position encoder is located further away from the reflective piece than from the first bearing.

8. The motorized optical scanner of claim 1, wherein the position encoder is configured to provides signals that facilitate determining one or more of a position, a speed, a phase, and a direction of the reflective piece.

9. The motorized optical scanner of claim 1, wherein at least a part of the position encoder comprises digital circuitry.

10. The motorized optical scanner of claim 1, wherein the position encoder comprises an encoder emitter driving circuit configured to control emitter current.

11. The motorized optical scanner of claim 10, further comprising an encoder receiver conditioning circuit comprising one or more analog or digital filters.

12. The motorized optical scanner of claim 1, further comprising a first bearing and a second bearing, wherein:
    the first bearing and the second bearing are mounted to, or a part of, a first bearing fixture and a second bearing fixture respectively; and
    each of the first bearing fixture and the second bearing fixture comprises a separate alignment mechanism.

13. A motorized optical scanner of a Light Detection and Ranging (LiDAR) system used in a motor vehicle, comprising:
    a reflective piece including a substrate and a reflective surface;
    a first shaft and a second shaft attached to a first end and a second end of the substrate respectively, the first end and the second end are opposite ends of the substrate;
    a first bearing and a second bearing coupled to the first shaft and the second shaft respectively; and
    an axial flux motor coupled to the second shaft, the axial flux motor being operative to move the second shaft, wherein movement of the second shaft causes the reflective surface to optically transmit one or more light beams to a field-of-view.

14. The motorized optical scanner of claim 13, wherein:
    the axial flux motor is coupled to a first portion of the second shaft;
    the second bearing is coupled to a second portion of the second shaft; and
    the second bearing is located further away from the reflective surface than from the axial flux motor.

15. The motorized optical scanner of claim 13, wherein the axial flux motor comprises:
    one or more stators;
    a rotor coupled to the second shaft;
    a first winding and a second winding, wherein the rotor is disposed between the first winding and the second winding.

16. The motorized optical scanner of claim 15, wherein the rotor comprises two axial magnetized half-cylinder magnets coupled to the second shaft.

17. The motorized optical scanner of claim 15, wherein the first winding and the second winding comprise flat coils mounted on the one or more stators.

18. The motorized optical scanner of claim 15, wherein the first winding and the second winding are mounted on one or more steel plates.

19. The motorized optical scanner of claim 15, wherein the rotor comprises a plurality of magnets mounted on one or more side surfaces of the rotor.

20. The motorized optical scanner of claim 13, further comprising a motor control circuit configured to control the axial flux motor to rotate or oscillate the second shaft such that the reflective piece rotates or oscillates to transmit the one or more light beams to the field-of-view.

21. The motorized optical scanner of claim 13, further comprising a position encoder coupled to the first shaft.

22. A Light Detection and Ranging (LiDAR) system used in a motor vehicle, the system comprising a motorized optical scanner, the motorized optical scanner comprises:
- a reflective piece including a substrate and a reflective surface;
- a first shaft and a second shaft attached to a first end and a second end of the substrate respectively, the first end and the second end being opposite ends of the substrate;
- a position encoder coupled to the first shaft, the position encoder being operative to monitor positions of the reflective piece; and
- a motor coupled to the second shaft, the motor being operative to move the reflective piece, wherein movement of the second shaft causes the reflective surface to optically transmit one or more light beams to a field-of-view.

23. A Light Detection and Ranging (LiDAR) system used in a motor vehicle, the system comprising a motorized optical scanner, the motorized optical scanner comprises:
- a reflective piece including a substrate and a reflective surface;
- a first shaft and a second shaft attached to a first end and a second end of the substrate respectively, the first end and the second end being opposite ends of the substrate;
- a first bearing and a second bearing coupled to the first shaft and the second shaft respectively; and
- an axial flux motor coupled to the second shaft, the axial flux motor being operative to move the second shaft, wherein movement of the second shaft causes the reflective surface to optically transmit one or more light beams to a field-of-view.

* * * * *